United States Patent

Breed

[15] 3,694,594
[45] Sept. 26, 1972

[54] LIQUID INTEGRATING ACCELEROMETER

[72] Inventor: David S. Breed, Box 270, R.D. 2, Boonton, N.J. 07005

[22] Filed: Dec. 23, 1970

[21] Appl. No.: 100,894

[52] U.S. Cl.....................................200/61.47, 73/503
[51] Int. Cl..............................................H01h 35/14
[58] Field of Search.......200/61.47, 152 K, 83 Y, 46, 200/53; 73/503; 102/79, 81; 137/38; 280/150 AB

[56] References Cited

UNITED STATES PATENTS

| | | | |
|---|---|---|---|
| 682,728 | 9/1901 | Lynch............................102/81 |
| 2,236,790 | 4/1941 | Erich.........................200/61.47 |
| 2,645,766 | 7/1953 | McDowell ..........200/61.47 X |
| 3,101,000 | 8/1963 | Lees...............................73/503 |
| 3,164,997 | 1/1965 | Aske...............................73/503 |
| 3,232,119 | 2/1966 | Salerno................200/61.47 X |
| 3,380,308 | 4/1968 | Burch et al. .........200/61.53 X |
| 3,524,031 | 8/1970 | Mack........................200/61.53 |
| 3,556,556 | 1/1971 | Goetz...................280/150 AB |
| 3,578,006 | 5/1971 | Betz...............................137/38 |

Primary Examiner—H. O. Jones
Assistant Examiner—M. Ginsburg
Attorney—Kane, Dalsimer, Kane, Sullivan & Kurucz

[57] ABSTRACT

An integrating accelerometer using a liquid which serves both as the sensing mass and the integrator through using the acceleration acting on the mass of the fluid to create a pressure which forces a small portion of the same fluid through a restriction giving rise to either laminar or turbulent duct flow or inertial flow through an orifice or sharp edge slit.

40 Claims, 7 Drawing Figures

INVENTOR
DAVID S. BREED

3,694,594

LIQUID INTEGRATING ACCELEROMETER

BACKGROUND OF THE INVENTION

Many types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on cylinder to release the gas to the bag. The latter inflates and provides a cushion against which an occupant may be thrown by the impact.

It has been suggested that the aforenoted sensing devices be integrating accelerometers utilizing either spring mass systems, mass dashpot systems or electronic systems. In the spring mass systems the acceleration is converted to kinetic energy of the mass and then converted subsequently to a compression of the spring. Such a device has been successful when the time delay required to convert the kinetic energy to a spring compression can be tolerated. A mass dashpot system has been successfully utilized when the acceleration to be sensed occurs in a single direction. Finally, electronic systems using piezoelectric crystals have been successfully utilized where environment conditions permit the use of electronic circuits, where the desired output is electrical and where the end use permits a relatively expensive device.

The integrating accelerometer of the present invention has been eminently successful where the integration must take place instantaneously, where the acceleration may come from more than one direction, where the output can be explosive or mechanical as well as electrical and where it is desired to have a low cost device.

SUMMARY OF THE INVENTION

Briefly, this invention consists of a chamber of known geometry which contains a fluid and a passage through which the fluid is adapted to flow with the flow rate through this passage being determined by the magnitude and direction of the acceleration of the chamber and its geometry. Acceleration is intended to cover any rate of change of velocity including deceleration.

One of the primary objects of this invention is to provide a non-electronic integrating accelerometer which performs the required integration instantaneously.

Another object of this invention is to provide an integrating accelerometer which will respond to an acceleration from more than one direction.

A further object of this invention is to provide an integrating accelerometer which will give the first integral of the acceleration.

Another object of this invention is to provide an integrating accelerometer which will take the integral of the excess acceleration over a predetermined threshold.

A further object of this invention is to provide an accelerometer which will give the first integral of the square root of the acceleration.

Another object of this invention is to integrate the square root of the excess acceleration over a given threshold.

A further object of this invention is to fire an explosive primer after a predetermined value of one of the aforementioned integrals.

Another object of this invention is to close a switch whenever the value of one of the aforementioned integrals exceeds a predetermined value.

A further object of this invention is to permanently close a switch when the value of one of the above mentioned integrals exceeds a predetermined value.

Another object of this invention is to provide a liquid integrating accelerometer the output of which is independent of temperature.

A further object of this invention is to provide an integrating accelerometer which will respond in a different and predetermined manner to acceleration from any direction.

Another object of this invention is to provide an integrating accelerometer to operate as a crash sensor for use with gas inflatable vehicle safety bags.

A further object of this invention is to provide an inexpensive integrating accelerometer.

Another object of this invention is to provide an exceptionally reliable integrating accelerometer.

A further object of this invention is to provide a hermetically sealed integrating accelerometer.

Another object of this invention is to provide an integrating accelerometer capable of withstanding rugged environments such as might be present over a period of years in an automobile.

Other objects and advantages of this invention will be made apparent as the description progresses.

BRIEF DESCRIPTION OF THE DRAWINGS

In the accompanying drawings in which two of various embodiments of the present invention are illustrated.

DESCRIPTION OF THE PREFERRED EMBODIMENTS

Figure 2:
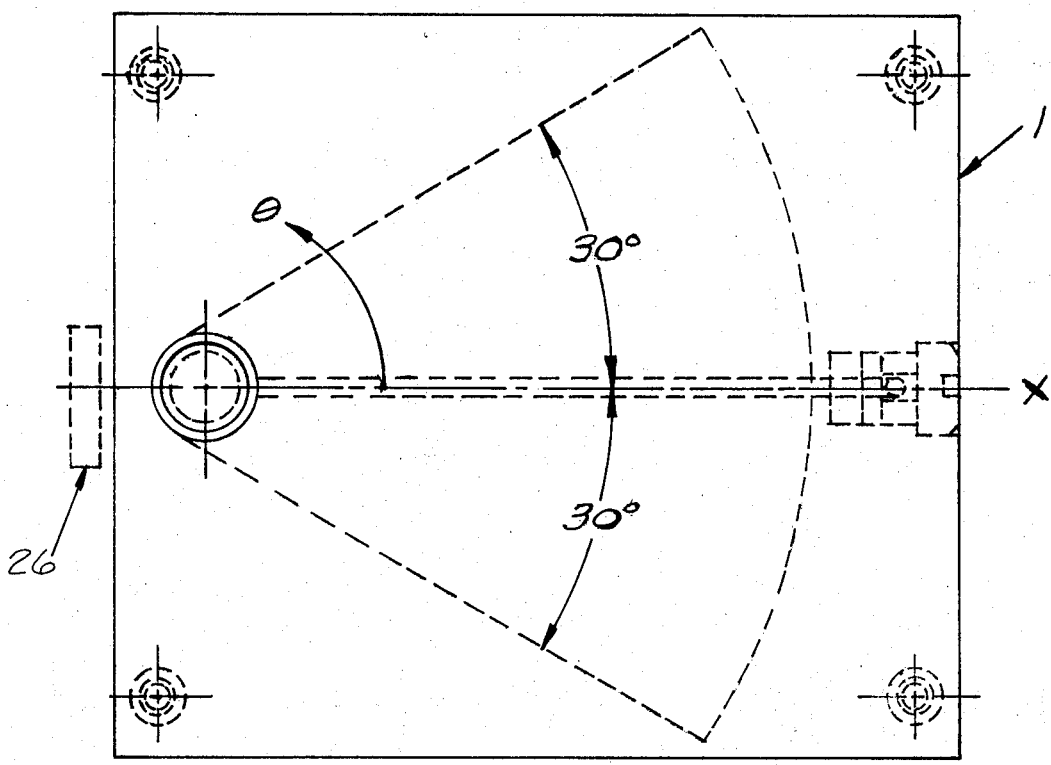
FIG. 2 is a top view of FIG. 1.
Figure 1:
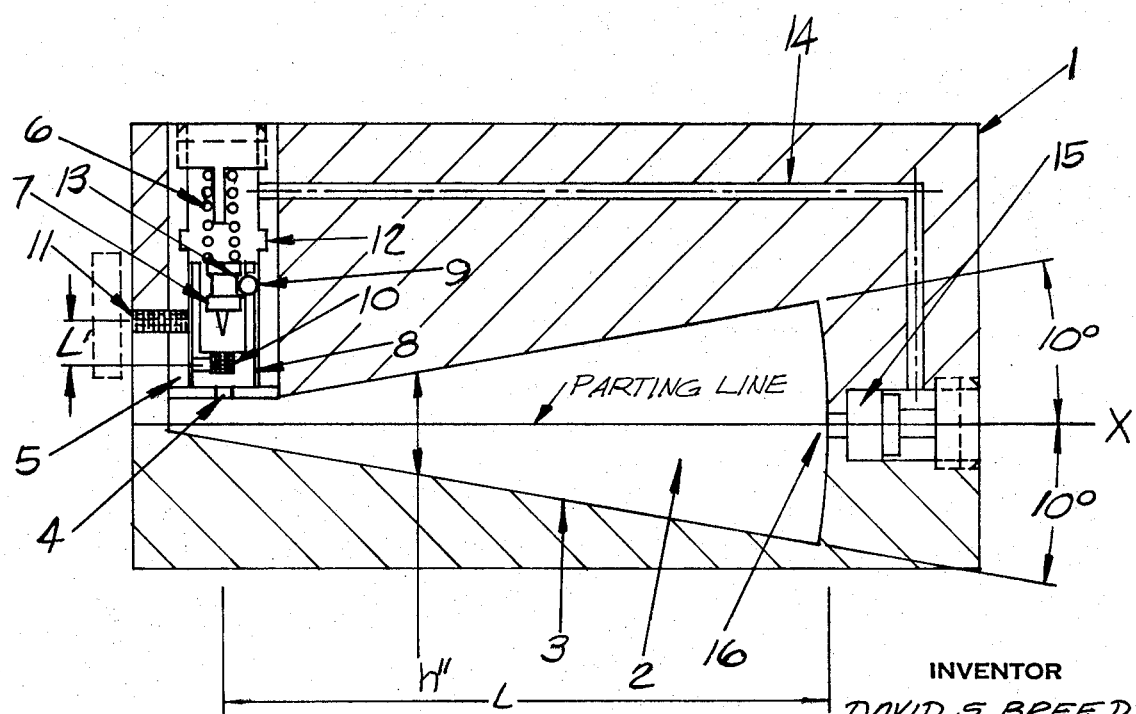
FIG. 1 is a side elevation of apparatus constructed in accordance with this invention where the output is pyrotechnic and where the device is designed to integrate accelerations from directions including plus or minus 30° in a horizontal plane from the X-axis and plus or minus 10° in a vertical plane from the X-axis.

Referring now to the drawings, an integrating accelerometer constructed according to the teachings of the present invention is illustrated at 1 in FIGS. 1 and 2. A liquid 2 substantially fills cavity 3 and is adapted to flow through a sharp edge orifice 4 into a cylinder 5 when the pressure in the cavity below the orifice 4 exceeds a threshold pressure created by a spring 6. The spring 6 acts on a firing pin 7 which is locked to a slider 8 by a ball 9 forcing the slider to exert a pressure on the fluid in the cylinder 5. When the accelerometer 1 is accelerated in the X direction a pressure appears in the chamber 3 below the orifice 4 equal to the magnitude of the acceleration times the length of the fluid cavity times the density of the fluid. When this pressure exceeds the pressure created by the spring 6 acting through the slider 8, which is equal to $F/\pi R^2$, the fluid will begin flowing through the sharp edge orifice 4 urging the slider 8 upward. Here F is the spring force and R is the radius of the cylinder 5. The sharp edge orifice restricts the flow of the fluid 2 into the cylinder 5 according to well-known orifice equations. The quantity of fluid which flows through the orifice 4 into cylinder 5 is thus a convenient measure of time integral of a particular function of the acceleration. If the acceleration is of sufficient duration and magnitude, sufficient volume of fluid 2 will flow through orifice 4 into cylinder 5 to lift the piston 8 a distance L'. At this point a primer 10 has become aligned with an explosive lead 11 and simultaneously the locking ball 9 has become aligned with cavity 12 and an angled portion 13 on firing pin 7 now urges the locking ball 9 into cavity 12 which then unlocks the firing pin 7 from the slider 8 permitting the spring 6 to propel the firing pin 7 into the primer 10. By this manner the firing pin 7 sets off the primer 10 which explodes and sets off the explosive lead 11 and can be used to initiate additional apparatus 26 such as a gas generator for an automobile safety bag which may be of the type disclosed in U.S. Pat. Nos. 3,532,358, 3,532,359, 3,532,360 all granted on Oct. 6, 1970.

The integrating accelerometer 1 shown in FIGS. 1 and 2 is designed to fire a primer when an acceleration of the proper magnitude and duration has been experienced originating from a direction which forms an angle of plus or minus 30° in a horizontal plane measured from the X-axis as shown in FIG. 2 and an angle of plus or minus 10° in a vertical plane measured from the X-axis as shown in FIG. 1. As the fluid travels through the sharp edge orifice 4 and if the portion of the accelerometer not containing the fluid was not evacuated, a gas such as air must be permitted to flow into the right end 16 of chamber 3. This is accomplished through a tube 14 which is connected to cylinder 5 and to a filter-like material 15. The pores in the filter 15 are chosen so that the surface tension of the fluid 2 will not permit the flow of the fluid into filter 15 under normal operating conditions. If tube 14 were sloped and sufficiently large so that the fluid would flow under gravity and not get trapped in the tube, filter 15 would not be required and tube 14 could be connected through a small vertical portion directly to chamber 3 at end 16.

If all excess gas except vapor from the fluid was removed from the accelerometer so as to achieve a partial vacuum in cylinder 5 above slider 8, then tube 14 and filter 15 would not be required. In such a case however a tube similar to 14 connected to chamber 3 at the top of end 16 could still be provided to permit a drain passage for any excess fluid which may have leaked past slider 8. In addition, a stand pipe could be connected to chamber 3 at the top of end 16 to provide for an excess of fluid to always maintain chamber 3 in a full condition and to provide for the thermal expansion and contraction of the fluid.

The clearance between the slider 8 and the cylinder 5 is small and carefully controlled such that under normal operation a negligible amount of fluid will flow between the slider 8 in the cylinder 6. This small clearance therefore effectively provides a seal between the piston and cylinder. As an alternate, a piston ring or O-ring seal could be included between the slider 8 and cylinder 5 to prevent the passage of fluid. However, the clearance seal is preferable in order to minimize the effects of friction. In the case where the fluid 2 is mercury the clearance between the cylinder 5 and the slider 8 could be chosen so that surface tension would completely prevent the flow of mercury in this passage.

In other applications the geometry of the chamber 3 could vary considerably from that of FIGS. 1 and 2. For example, it could take the form of a sphere if it were desired to sense and integrate accelerations from all directions. Or, additional chambers could be connected to chamber 3 at the orifice section 4 if it were desired to sense and integrate accelerations from another particular range of directions. The length L of the chamber could itself vary with direction to permit different sensitivities of the device to accelerations from different directions. A long tube, for example, might extend downward from cavity 3 below orifice 4 which could be used to sense whether accelerometer 1 was inverted and thus experiencing the acceleration of gravity. Such a modification for example might be useful in sensing rollover in an automobile. Also, substantial portions of the interior of the chamber could be blocked out so as to minimize the quantity of fluid used.

Figure 5:
FIG. 5 is a cross section view of a tubular restrictor to be used with the apparatus shown in FIGS. 1 and 2.
Figure 6:
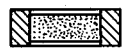
FIG. 6 is a porous plug restrictor to be used with the apparatus shown in FIGS. 1 and 2.
Figure 7:
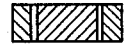
FIG. 7 is a concentric cylinder restrictor to be used with the apparatus of FIGS. 1 and 2.

In place of the sharp edge orifice restrictor used with the apparatus shown in FIGS. 1 and 2, a tubular restrictor as shown in FIG. 5 could be used. Alternately, a porous plug restrictor as shown in FIG. 6 could replace the sharp edge orifice restrictor 4 of FIG. 2. In addition, a restrictor created by the clearance between two concentric cylinders as shown in FIG. 7 could be used for a given application where a temperature compensated laminar flow restrictor is desired.

Figure 3:
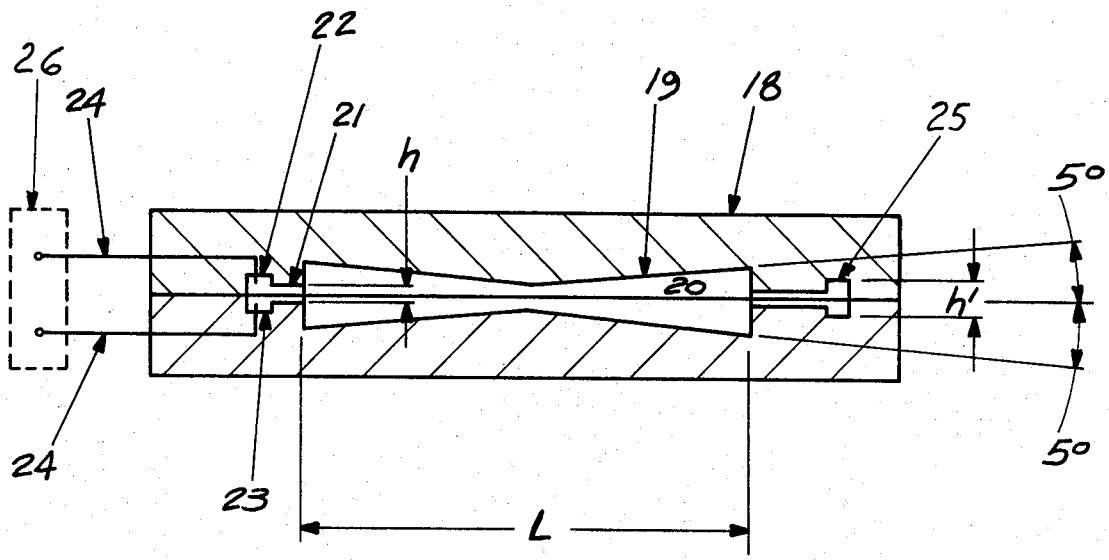
FIG. 3 is a side elevation of apparatus constructed in accordance with this invention wherein the sensing fluid is conductive and the output is the bridging of a set of contacts.
Figure 4:
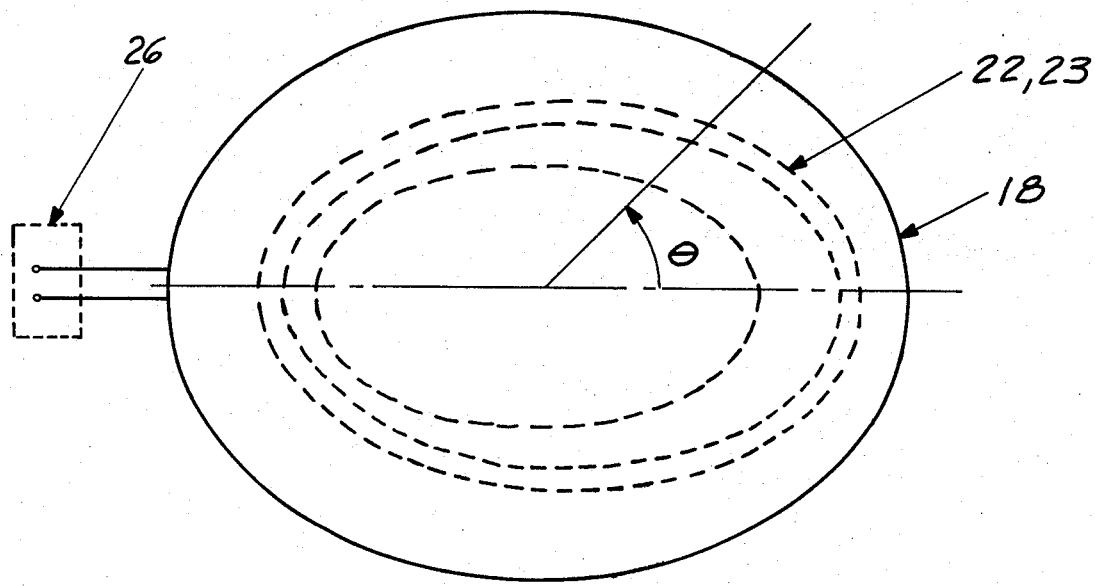
FIG. 4 is a top view of FIG. 3.

Referring now to FIG. 3, which is a second preferred embodiment of the present invention, wherein is shown a side view of accelerometer 18 and to FIG. 4 showing a top view of FIG. 3, accelerometer 18 consists of a chamber 19 which contains an electrically conductive fluid 20, such as mercury. A ring shaped passage 21 is provided wherein the fluid 20 is adapted to flow. The thickness $h$ of passage 21 is sufficiently small that the surface tension of the fluid 20 prevents the flow of the fluid into the passage 21 until a threshold pressure $P_o$ appears at the entrance to passage 21. This pressure $P_o$ is equal to $2T/h$ where T is the surface tension of the liquid 20 and $h$ is the clearance in the ring passage. When the accelerometer 18 is accelerated a pressure appears at the entrance to passage 21 equal to $\rho AL$ where $\rho$ is the density of the fluid, a the acceleration and L the length of fluid 20 from the entrance to the passage 21 extending to the outermost fluid boundary in the direction of the acceleration. While the accelerometer 18 is experiencing an acceleration of sufficient magnitude, a portion of the fluid 20 flows in the passage 21 at a rate controlled by the pressure induced by the acceleration and the thickness of the passage $h$. The distance which the fluid 20 has traveled in the passage 21 is thus a convenient measure of the integral over time of a particular function of the acceleration. When the conducting liquid 20 travels sufficiently far to bridge the electrical contacts 22 and 23 a current is permitted to flow through wire 24. This action coupled with appropriate circuitry and a power supply could be used, for example, to initiate apparatus 26 such as a gas generator and an automobile safety bag as mentioned in the above or alternately a valve could be opened permitting gas from a bottle to inflate the safety bag. The accelerometer 18 shown in this example is designed to integrate accelerations from any direction in the horizontal plane and from plus or minus 5° in the vertical plane. Although the thickness $h$ of the passage 21 is shown as a constant it could in fact be varied as a function of $\theta$ where $\theta$ is the angular coordinate defined in FIG. 4. This would then effect the threshhold acceleration at which the device begins integrating. Thus, this threshhold acceleration could be infinitely varied as a function of direction. Similarly, the location of the contacts 22 and 23 could be varied as a function of $\theta$ by varying the length of passage 21 as shown thereby permitting an infinite variation of the value of the acceleration function integral as a function of acceleration direction. These two parameters could thus be varied for example to permit deployment of an automobile safety bag for one set of crash conditions for a frontal crash and entirely different set of crash conditions for a rear crash and still different sets of conditions for right and left side crashes.

For accelerometer 18 the passage 21 would also serve to provide a passage for a gas such as air to flow in such a manner as to fill the volume vacated by the fluid in chamber 19 if the accelerometer had not been evacuated during manufacture.

In order to provide a permanent electrical contact after the appropriate acceleration time integral has exceeded a design value, the clearance $h$ of passage 21 can contain an enlarged secton 25 which would thus trap the conducting fluid. Thus, once sufficient fluid has flowed through passage 21 to bridge the contacts 22 and 23, these contacts will remain permanently bridged.

Any of three types of flow could be utilized in the passages described. If the passage consists of a sharp edge orifice or sharp edge slit and if the Reynolds number exceeds 1, then inertial flow would predominate. The equation for the flow rate through a sharp edge orifice is:

$$Q = CA'\sqrt{2P/\rho} \quad (1)$$

where:
$Q$ = volume flow rate
$C$ = experimental constant
$A'$ = area of orifice
$P$ = pressure drop across orifice
$\rho$ = density of the fluid The pressure drop $P$ is related to the acceleration of the accelerometer by the following equation.

$$P = \rho AL - P_o \quad (2)$$

Where:
$A$ = acceleration
$L$ = length of the fluid from the entrance to the orifice extending in the direction of the acceleration
$P_o$ = bias pressure The bias pressure $P_o$ can be determined for the examples of FIGS. 1 and 2 by the following equation:

$$P_o = F/\pi R^2 \quad (3)$$

Where:
$F$ = spring force
$R$ = radius of cylinder 5

For the accelerometer 18 illustrated in FIGS. 3 and 4 $P_o$ can be calculated from the equation:

$$P_o = 2T/h \quad (4)$$

Where:
$T$ = surface tension of the fluid interface
$h$ = thickness of the passage If Equation 2 is substituted into Equation 1 and the result integrated with respect to time, the following equation results:

$$V = CA\sqrt{2}\int\sqrt{AL - \frac{P_o}{\rho}}\,dt \quad (5)$$

Where:
$V$ = volume of the fluid which passed through the orifice

If the volume $V$ is divided by the cross section area of the cylinder 5 the height to which the fluid rises in response to a given acceleration signature of the accelerometer can be determined.

In the above development it has been assumed that the motion of the center of mass of the fluid 2 can be neglected and thus there are no appreciable energy losses within the chamber 3 of FIG. 1.

A second type of flow, turbulent duct flow, can be achieved if the Reynolds number for the flow in the passage exceeds approximately 2,000. This would be accomplished in the example of FIGS. 1 and 2 if the orifice were replaced by a tube having a length that may be varied depending upon the characteristics of the flow restriction desired. Similarly, the flow in the passage 21 of FIG. 3 would be turbulent providing the Reynolds number is sufficiently large. The equations for turbulent flow would follow a similar development as presented in Equations 1 through 5 above and are well-known to those skilled in the art. Consequently, they will be omitted here for the sake of brevity. The total volume of fluid passing would obey an equation similar to Equation 5 wherein the volume is proportional to the integral of the square root of the applied acceleration minus an appropriate bias value. Turbulent duct flow and inertial flow through an orifice have the inherent advantage that viscous effects can be neglected resulting in an accelerometer whose characteristics are relatively independent of temperature.

A third type of flow envisioned in this invention is laminar duct flow. This could be achieved by replacing the orifice 4 of FIG. 1 with a tube as described above such that the Reynolds number for flow through this tube would be much smaller than 2,000. The equations for laminar flow of a fluid through a tube are well-known to those skilled in the art of fluid dynamics. Suffice it is to say that the volume flow rate is proportional to the first power of the pressure drop across the passage as opposed to the square root relationship of Equation 1. This results in an equation of the following form.

$$V = \frac{K}{\mu} \int (\rho A L - P_o) dt \qquad (6)$$

Where:
- $V$ = volume of fluid which has passed through the passage
- $K$ = is a constant depending upon the geometry of the tube
- $\mu$ = viscosity of the fluid It can be seen from this equation that a laminar duct flow integrating accelerometer will integrate the first power of the acceleration. Also, from this equation, it can be seen that characteristics of the accelerometer are dependent upon the viscosity of the fluid which usually varies significantly with temperature. This dependence on temperature can be compensated for in a number of ways. For example the tubular passage could be replaced with an annular passage which is created as the clearance between two fixed concentric or offset cylinders. The two cylinders could then be manufactured from materials having different coefficients of thermal expansion and the clearance could be properly chosen such that this clearance would change with temperature in such a manner as to compensate for the changes in fluid viscosity over any desired temperature range.

Naturally the three flows could be mixed if it were desired to achieve a time integral of the acceleration raised to some power intermediate between 1 and ½. Also an integrating accelerometer could be designed to operate in the laminar regime for some acceleration inputs and the turbulent regime for others. A porous plug, for example, can be designed to yield both viscous and inertial effects.

The particular mechanism used in the example of FIGS. 1 and 2 is purely illustrative. Other alternatives include the substitution of two electrical contacts for the firing pin and primer resulting in a switch closure after the appropriate acceleration time integral. Similarly, a continuous reading of this integral could be obtained by replacing the slider and firing pin assembly with a rod which could be attached with the appropriate linkages to a chart recorder pen or to an appropriate transducer if a continuous electrical output is desired.

Although mercury is the preferred fluid for the integrating accelerometers of this invention, most any liquid could be used for the accelerometer depicted in FIGS. 1 and 2. In particular any one of a number of fluids having a high specific gravity of which a number of bromine based liquids are readily available would be satisfactory. The use of mercury in the accelerometer of FIGS. 1 and 2 would result in the smallest volume for the accelerometer, however, due to the high cost of mercury, other fluids might be more desirable particularly where the space for the accelerometer is not limited. In the accelerometer of FIGS. 1 and 2 the mechanical force required on the slider 8 is one of the prime factors which determines the size of the entire unit. In the example shown this force must be sufficient to overcome frictional forces caused by the locking ball 9 rubbing on the cylinder 5 and the spring force 6 which is determined somewhat by the energy required to set off a primer with a firing pin.

One integrating accelerometer of the type depicted in FIGS. 1 and 2 which has performed satisfactorily consists of a chamber 3 having a length of 2 inches and a depth $h''$ ranging from 0.05 inches directly underneath the orifice 4 to 0.22 inches at the end 16. The internal diameter of the cylinder 5 is 0.25 inches and the radial clearance between the slider 8 and the cylinder 5 is 0.0001 inches. The spring 6 gives a force of 8 ounces and the travel required for the firing pin to be released, $L'$, is 0.150 inches. The diameter of the orifice 4 is 0.050 inches. The fluid 2 utilized in this particular example was mercury into which having been dissolved approximately 8 percent thallium in order to lower the freezing point of the alloy below $-65°$ F. This device is used in conjunction with an automobile safety bag to initiate the filling of the bag upon the proper crash conditions.

The integrating accelerometer 18 depicted in FIGS. 3 and 4 has also found applicability in the automobile crash sensing field. An accelerometer of this type has been constructed using mercury as the working fluid with a chamber having a length L of 1 inch and a depth at the center of 0.02 inches. The depth of the passage $h$ was 0.002 inches and the length of the passage to the area of the contacts was 0.3 inches. The height $h'$ was 0.003 inches. As can be seen where only an electrical output is desired, this device can be considerably smaller and consequently much less expensive than the integrating accelerometer depicted in FIGS. 1 and 2.

In all of the applications of this invention the motion of the bulk of the fluid is small with only a small portion of the fluid flowing in the passage. The major resistance to the motion of the mass of the fluid is thus created by the resistance to flow of the fluid in said passage. Thus, the acceleration experienced by the accelerometer is used to create a pressure which because of the resistance to flow of the passage causes only a small portion of the fluid to flow as opposed to the situation where the inertia of the fluid mass itself provides the resistance to the motion of the bulk of the fluid in the chamber.

Thus, the numerous aforenoted objects and advantages among others are most effectively attained. Although two preferred embodiments and applications have been described, discussed and illustrated herein, it should be understood that this invention is in no sense limited thereby but its scope is to be determined by that of the appended claims.

I claim:

1. An integrating accelerometer including a chamber having a portion containing a fluid, a fluid receiving portion, and a restricting passage, positioned between said fluid and said fluid receiving portion, through which a portion of the fluid is adapted to flow; means for permitting the mass of the fluid to be used to sense the acceleration and the volume flow of the fluid through said passage into said fluid receiving portion which volume is a measure of an integral over time of a function of the acceleration; and said fluid containing portion and said passage providing means whereby a major portion of the force induced by the acceleration is used to force the fluid through the restricting passage rather than to substantially move the bulk of the fluid in said fluid containing portion.

2. The invention in accordance with claim 1 wherein means are provided for sensing time integrals of accelerations occurring from more than one direction.

3. The invention in accordance with claim 2 wherein several direction sensitivity is achieved through a substantially two dimensional chamber.

4. The invention in accordance with claim 3 wherein the geometry of the chamber is varied so as to achieve different threshhold acceleration sensing and different particular values and forms of the integral of the acceleration for different directions of acceleration.

5. The invention in accordance with claim 2 wherein the chamber is so shaped as to permit the sensing and integrating of acceleration from a variety of directions having different latitudinal and longitudinal coordinates.

6. The invention in accordance with claim 5 wherein the geometry of the chamber or of the fluid flow passage is varied to permit different acceleration threshold sensing and different particular values and forms of the integral of the acceleration for different directions of acceleration.

7. The invention in accordance with claim 1 wherein a piston and a cylinder is provided and the output of the integrating accelerometer when subject to the proper acceleration stimulus is the motion of a piston in a cylinder.

8. The invention in accordance with claim 7 wherein the clearance between the piston and cylinder serves as a seal to prevent the fluid from flowing past the piston.

9. The invention in accordance with claim 7 wherein a firing pin and aligned primer and means for releasibly latching said firing pin are pro-vided and upon the proper travel of the piston the firing is released and the primer is initiated.

10. The invention in accordance with claim 1 wherein the fluid passage is a tube.

11. The invention in accordance with claim 1 wherein the fluid passage is a sharp edge opening.

12. The invention in accordance with claim 1 wherein the fluid passage is defined by the clearance between two substantially plane surfaces.

13. The invention in accordance with claim 1 wherein the flow passage includes a porous plug.

14. The invention in accordance with claim 1 wherein the passage through which the fluid flows is defined by the clearance between two concentric or offset cylinders.

15. The invention in accordance with claim 14 wherein the cylinders have different thermal expansion coefficients chosen in such a way as to permit compensation for the change in viscosity of the fluid with temperature.

16. The invention in accordance with claim 1 wherein the flow through the passage is laminar flow.

17. The invention in accordance with claim 1 wherein the integrating accelerometer integrates over time the acceleration minus a certain threshhold acceleration.

18. The invention in accordance with claim 1 wherein the flow through the restricting passage is turbulent flow.

19. The invention in accordance with claim 1 wherein the flow through the passage is inertial flow through a sharp edge opening.

20. The invention in accordance with claim 1 wherein the flow through the passage is mixed flow showing both viscous and inertial effects.

21. The invention in accordance with claim 1 wherein the accelerometer measures the integral over time of a power of the acceleration minus a certain bias value, where the power has a value between 0.5 and 1.

22. The invention in accordance with claim 1 wherein the accelerometer measures the integral over time of the square root of the acceleration minus a certain bias value.

23. The invention in accordance with claim 1 wherein means are provided to prevent the integrating accelerometer from operating until a certain threshold or bias acceleration is achieved.

24. The invention in accordance with claim 23 wherein this threshhold or bias acceleration requirement is achieved through imposing a pressure on the fluid downstream of the passage.

25. The invention in accordance with claim 24 wherein the bias pressure is achieved through a spring loaded piston.

26. The invention in accordance with claim 23 wherein the bias acceleration is achieved by utilizing small clearances in the fluid passage and the surface tension properties of the fluid such that the fluid will not flow in the passage until a pressure is achieved in the fluid sufficient to overcome the surface tension.

27. The invention in accordance with claim 1 wherein the fluid is mercury.

28. The invention in accordance with claim 27 wherein the mercury is alloyed to lower the freezing point of the liquid.

29. The invention in accordance with claim 28 where the alloying element is thallium.

30. The invention in accordance with claim 1 wherein the fluid is electrically conductive.

31. The invention in accordance with claim 30 wherein the fluid bridges a set of contacts at an appropriate value of the integral over time of the appropriate acceleration function.

32. The invention in accordance with claim 31 wherein means are provided to trap the conducting fluid in the area of the contacts to maintain permanent contact closure.

33. The invention in accordance with claim 30 wherein means are provided incorporating the placement of the contacts so as to require different travels of the fluid in the passage for different directions of acceleration.

34. The invention in accordance with claim 1 wherein means are provided to hermetically seal the integrating accelerometer.

35. The invention in accordance with claim 1 wherein means are provided to adapt the device to a vehicle with the device serving as a vehicle crash sensor.

36. The invention in accordance with claim 1 wherein means are provided for a gas to be fed into the volume within the chamber which is vacated by the fluid.

37. The invention in accordance with claim 32 wherein a filter type material is used between the fluid and the gas source which permits the passage of the gas but forbids the passage of the fluid.

38. The invention in accordance with claim 1 wherein a substantial portion of the gas is evacuated from that portion of the accelerometer not containing the fluid.

39. The invention in accordance with claim 25 wherein a return flow tube is provided to return excess fluid from above the piston to the chamber.

40. The invention in accordance with claim 1 wherein a stand pipe is provided to supply fluid to the chamber and to permit the thermal expansion and contraction of the fluid.

* * * * *